United States Patent
Zhang et al.

(10) Patent No.: US 11,499,048 B2
(45) Date of Patent: Nov. 15, 2022

(54) TOUGH POLYAMIDE MOULDING MATERIAL

(71) Applicant: Evonik Specialty Chemicals (Shanghai) Co., Ltd., Shanghai (CN)

(72) Inventors: Hong Zhang, Shanghai (CN); Jianmin Yang, Shanghai (CN); Fei Teng, Shanghai (CN); Zhisheng Wang, Shanghai (CN); Yi Jhen Huang, Taipei (TW)

(73) Assignee: Evonik Specialty Chemicals (Shanghai) Co., Ltd., Shanghai (CN)

( * ) Notice: Subject to any disclaimer, the term of this patent is extended or adjusted under 35 U.S.C. 154(b) by 470 days.

(21) Appl. No.: 16/651,077

(22) PCT Filed: Sep. 27, 2017

(86) PCT No.: PCT/CN2017/103607
§ 371 (c)(1),
(2) Date: Mar. 26, 2020

(87) PCT Pub. No.: WO2019/061058
PCT Pub. Date: Apr. 4, 2019

(65) Prior Publication Data
US 2020/0224027 A1 Jul. 16, 2020

(51) Int. Cl.
| | |
|---|---|
| C08L 77/00 | (2006.01) |
| B29C 45/00 | (2006.01) |
| C08L 53/02 | (2006.01) |
| B29K 77/00 | (2006.01) |

(52) U.S. Cl.
CPC .......... *C08L 77/00* (2013.01); *B29C 45/0001* (2013.01); *C08L 53/025* (2013.01); *B29K 2077/00* (2013.01); *C08L 2207/53* (2013.01)

(58) Field of Classification Search
CPC ............................ C08L 77/00; B29C 45/0001
See application file for complete search history.

(56) References Cited

U.S. PATENT DOCUMENTS

| | | |
|---|---|---|
| 3,393,210 A | 7/1968 | Speck |
| 4,423,188 A | 12/1983 | Witschard |
| 5,360,891 A | 11/1994 | Wenzel et al. |
| 5,534,594 A | 7/1996 | Troy et al. |
| 5,599,854 A | 2/1997 | Troy et al. |
| 5,760,105 A | 6/1998 | Okada et al. |
| 6,579,581 B2 | 6/2003 | Bartz et al. |
| 7,026,394 B2 | 4/2006 | Park et al. |
| 9,109,115 B2 | 8/2015 | Bühler |
| 10,836,903 B2 | 11/2020 | Peirick et al. |
| 10,844,222 B2 | 11/2020 | Yang et al. |
| 2005/0058845 A1 | 3/2005 | Bellet et al. |
| 2014/0066561 A1 | 3/2014 | Pfleghar et al. |
| 2014/0275392 A1 | 9/2014 | Bühler |
| 2015/0099847 A1 | 4/2015 | Huelsmann et al. |
| 2017/0240741 A1 | 8/2017 | Ichihara et al. |
| 2018/0044520 A1 | 2/2018 | Peirick et al. |
| 2019/0153221 A1 | 5/2019 | Yang et al. |
| 2020/0299508 A1 | 9/2020 | Yang et al. |

FOREIGN PATENT DOCUMENTS

| | | |
|---|---|---|
| CN | 1133297 | 10/1996 |
| CN | 1330111 | 1/2002 |
| CN | 1845821 | 10/2006 |
| CN | 104046010 | 9/2014 |
| DE | 1 595 150 | 3/1970 |
| EP | 0 479 545 | 4/1992 |
| EP | 0 619 336 | 10/1994 |
| EP | 0 722 961 | 7/1996 |
| EP | 1 031 605 | 8/2000 |
| EP | 2 778 190 | 9/2014 |
| JP | H06-287297 | 10/1994 |
| JP | H07-48487 | 2/1995 |
| JP | 2003-531236 | 10/2003 |
| JP | 2016-108386 | 6/2016 |
| WO | 2016/071409 | 5/2016 |
| WO | 2020/228621 | 11/2020 |

OTHER PUBLICATIONS

U.S. Appl. No. 15/733,077, filed May 12, 2020, 2020/0299508, Yang et al.
Chinese Office Action dated Mar. 15, 2022, in Chinese Patent Application No. 201780095405.X, 6 pages.
Yag Mingshan et al., "Modern Engineering Plastics Modification", China Light Industry Press, No. 20090731, 2009, pp. 193-194.
Extended European Search Report dated Nov. 20, 2019 in European Application No. 17901332.1.
International Search Report dated Jul. 5, 2018 in PCT/CN2017/103607.
Written Opinion dated Jul. 5, 2018 in PCT/CN2017/103607.

*Primary Examiner* — Arrie L Reuther
(74) *Attorney, Agent, or Firm* — Grüneberg and Myers PLLC

(57) ABSTRACT

A moulding material contains to an extent of at least 50 wt % of the combination of the following constituents: a) 80 to 95 parts by mass of a polyamide component comprising a1) 70 to 100 parts by wt of PA PACMX and a2) 30 to 0 parts by wt of a linear aliphatic polyamide, b) 4 to 19 parts by mass of a core-shell impact modifier, and c) 1 to 5 parts by mass of a functionalized styrene-ethylene/butylene-styrene block copolymer as an impact modifier, wherein the parts by mass of a), b) and c) sum to 100. The moulding material has a high transparency and a very good notched impact strength.

20 Claims, No Drawings

TOUGH POLYAMIDE MOULDING MATERIAL

CROSS-REFERENCE TO RELATED APPLICATION

This application is a National Stage entry under § 371 of International Application No. PCT/CN2017/103607, filed on Sep. 27, 2017, which is incorporated by reference in its entirety.

The present invention relates to a moulding material which comprises a transparent polyamide and the combination of a special core-shell impact modifier and a special linear triblock copolymer impact modifier. Such moulding materials are transparent and exhibit improved mechanical properties compared to the base polymer.

Transparent polyamides made of bis(4-aminocyclohexyl)methane (PACM) having a content of trans, trans-stereoisomer of 30 to 70% and also dodecanedioic acid are known from DE 15 95 150 A1. Corresponding transparent polyamides made of from 35 to 60 mol % of trans, trans-bis(4-aminocyclohexyl)methane and 65 to 40 mol % of other diamines and also linear aliphatic dicarboxylic acids are described in EP 0 619 336 A2.

Polyamides based on PACM have valuable performance characteristics, for example at a suitable composition they are transparent but microcrystalline and thus solvent- and stress-cracking-resistant; their mechanical properties, for instance impact strength, are of a high standard. However impact strength, notch sensitivity and puncture resistance are still in need of improvement. This is important for example in the field of eyeglasses frames or other frames in particular in "sports" and "defence" applications.

The present invention has for its object to improve the notched impact strength of corresponding mouldings without significantly lowering of the transparency of the moulding materials. The recited requirements are typically met by toughness modification of the base polymers. However, toughness modification of transparent polymers is problematic since these moulding materials become cloudy as a result of mixing with the toughness modifier.

US2015/0099847A1 describes transparent polyamide blends based on PA PACM12 and a PA12 which achieve good transmissions but have only moderate notched impact strength.

US2014/275392A1 describes polyamide moulding materials based on PACM or bis(3-methyl-4-aminocyclohexyl)methane (MACM) and decanedicarboxylic acid, dodecanedicarboxylic acid or tetradecanedicarboxylic acid which additionally comprise a functionalized styrene-ethylene/butylene-styrene block copolymer as an impact modifier. Examples 4 and 5 describe production of moulding materials from PA PACM12 and the functionalized styrene-ethylene/butylene-styrene block copolymer as the impact modifier. A haze of about 25% is achieved with these moulding materials.

It has now been found that, surprisingly, that the haze of the moulding materials can be further improved with suitable core-shell impact modifiers.

The problem was accordingly solved by a moulding material which consists to an extent of at least 50 wt %, preferably at least 60 wt %, particularly preferably at least 70 wt %, especially preferably at least 80 wt % and very particularly preferably at least 90 wt %, of the combination of the following constituents:
a) 80 to 95 parts by mass, preferably 85 to 95 parts by mass a polyamide component comprising a1) 70 to 100 parts by wt, preferably 75 to 99 parts by wt, particularly preferably 80 to 98 parts by wt and especially preferably 85 to 97 parts by wt of PA PACMX (where X=8 to 18) and
a2) 30 to 0 parts by wt, preferably 25 to 1 parts by wt, particularly preferably 20 to 2 parts by wt and especially preferably 15 to 3 parts by wt of a linear aliphatic polyamide having on average 8 to 12 carbon atoms in the monomer units,
wherein the parts by wt of a1) and a2) sum to 100,
b) 19 to 4 parts by mass, preferably 15 to 5 parts by mass of a core-shell impact modifier which comprises the following:
b1) a core which comprises 60 to 100 wt % and preferably 70 to 100 wt % of butadiene units and 0 to 40 wt % and preferably 0 to 30 wt % of styrene units, wherein the reported percentages are based on the core and wherein the core makes up 60 to 95 wt %, preferably 70 to 94 wt % and particularly preferably 75 to 93 wt % of the core-shell impact modifier, and
b2) a shell which comprises 80 to 100 wt % and preferably 90 to 100 wt % of methyl methacrylate units and 0 to 20 wt % and preferably 0 to 10 wt % of modifying monomer units in each case based on the shell and wherein the shell makes up 40 to 5 wt %, preferably 30 to 6 wt % and particularly preferably 25 to 7 wt % of the core-shell impact modifier, and
c) 5 to 1 parts by mass of a functionalised styrene-ethylene/butylene-styrene block copolymer as an impact modifier,
wherein the parts by mass of a), b) and c) sum to 100.

The nomenclature used here for the polyamides is in accordance with EN ISO 1874-1. Accordingly, PA PACMX describes a polyamide composed of monomer units which derive from bis(4-aminocyclohexyl)methane (PACM) and a linear dicarboxylic acid having X carbon atoms. According to the invention said linear dicarboxylic acid having X carbon atoms may be:
X=8: octanedioic acid (suberic acid)
X=9: nonanedioic acid (azelaic acid)
X=10: decanedioic acid (sebacic acid)
X=11: undecanedioic acid
X=12: dodecanedioic acid
X=13: tridecanedioic acid (brassylic acid)
X=14: tetradecanedioic acid
X=15: pentadecanedioic acid
X=16: hexadecanedioic acid
X=17: heptadecanedioic acid
X=18: octadecanedioic acid
In one preferred embodiment X is an even number; in another preferred embodiment X is 10 to 14 and particularly preferably 12.

The PA PACMX is typically produced from PACM and the dicarboxylic acid by polycondensation in the melt according to known processes. However, derivatives thereof may also be employed, for example the diisocyanate which derives from PACM, or a dicarboxylic diester.

PACM exists as a mixture of cis, cis, cis, trans and trans, trans isomers. It is commercially available with various isomer ratios. In one preferred embodiment the trans, trans isomer content of the PACM or of the employed derivative thereof is 30 to 70% and particularly preferably from 35 to 65%.

In another preferred embodiment the PA PACMX is microcrystalline with an enthalpy of fusion, measured in accordance with ISO 11357 at the 2nd heating at a heating and cooling rate of 20° C./min, of 5 to 40 J/g and particularly preferably of 8 to 35 J/g.

It is further preferable when the PA PACMX is transparent with a haze of less than 3% and particularly preferably of less than 2% where both properties are determined to ASTM D1003 on injection moulded test specimens of 2 mm in thickness.

It is particularly preferable when the PA PACMX is a PA PACM12 in which the trans, trans isomer content of the PACM or of the employed derivative thereof is 30 to 70% and especially preferably 35 to 65% and which is microcrystalline with an enthalpy of fusion, measured in accordance with ISO 11357 at the 2nd heating at a heating and cooling rate of 20° C./min, of 5 to 40 J/g and particularly preferably of 8 to 35 J/g.

The linear aliphatic polyamide according to a2) has on average from 8 to 12 carbon atoms in the individual monomer units. Said polyamide is producible from a combination of diamine and dicarboxylic acid, from an ω-aminocarboxylic acid and/or the corresponding lactam. The monomer units in question are therefore the units which derive from lactam, ω-aminocarboxylic acid, diamine or dicarboxylic acid. The following polyamides are suitable by way of example:

Average of 8 carbon atoms: PA88, PA79, PA97, PA610, PA106
Average of 8.5 carbon atoms: PA89, PA98, PA611, PA116, PA512
Average of 9 carbon atoms: PA99, PA810, PA108, PA612, PA126
Average of 9.5 carbon atoms: PA910, PA109, PA811, PA118, PA613, PA136, PA514
Average of 10 carbon atoms: PA10, PA1010, PA812, PA128, PA614, PA146
Average of 10.5 carbon atoms: PA1011, PA813, PA138, PA516
Average of 11 carbon atoms: PA11, PA1012, PA1210, PA913, PA139, PA814, PA148, PA616
Average of 11.5 carbon atoms: PA1112, PA1211, PA1013, PA1310, PA914, PA149, PA815, PA617, PA518
Average of 12 carbon atoms: PA12, PA1212, PA1113, PA1014, PA1410, PA816, PA618

Suitable polyamides further include copolyamides which, on the basis of suitable comonomer selection, comply with the proviso that the monomer units comprise on average 8 to 12 carbon atoms, for example the copolyamide composed of laurolactam, decanediamine and dodecanedioic acid (co-PA12/1012). It will be appreciated that the component according to a2) employed may also be mixtures of appropriate polyamides, sufficient mutual compatibility being advantageous.

In one preferred embodiment the linear aliphatic polyamide according to a2) is semicrystalline with an enthalpy of fusion, measured in accordance with ISO 11357 at the 2nd heating at a heating and cooling rate of 20° C./min, of at least 20 J/g, particularly preferably of at least 25 J/g and especially preferably of at least 30 J/g.

The linear aliphatic polyamide according to a2) preferably has a relative solution viscosity $\eta_{rel}$ of 1.3 to 2.4, particularly preferably of 1.4 to 2.2 and especially preferably of 1.5 to 2.1. Here, $\eta_{rel}$ is determined to ISO 307 in a 0.5 wt % solution in m-cresol at 23° C. If the intention is to achieve particularly good flowability of the melt, it is advantageous to use a linear aliphatic polyamide having a low relative solution viscosity $\eta_{rel}$, for example in the range from 1.3 to 1.9, preferably in the range from 1.3 to 1.8, and particularly preferably in the range from 1.3 to 1.7.

Preferably employed linear aliphatic polyamides according to a2) are PA612, PA1010, PA1012, PA11 or PA12, particularly preferably PA11 or PA12.

In a preferred embodiment the polyamide component according to a) consists only of the polyamide a1) while a2) is not present.

The core-shell modifier consists of particles having a weight-average diameter of 20 to 500 nm, preferably of 30 to 400 nm, particularly preferably of 40 to 350 nm and especially preferably of 50 to 300 nm. The core may be uncrosslinked; it is preferably crosslinked. The shell may be uncrosslinked or crosslinked. Crosslinking may be achieved during production by addition of a compound having two or more vinyl groups, for example divinylbenzene, ethylene glycol dimethylacrylate, trimethacrylates, triacrylates, allyl acrylate, allyl methacrylate, diallyl phthalate or triallyl isocyanurate.

The shell may also have incorporated into it by polymerization further monomers having a functional group capable of reacting with polyamide, for example acrylic acid, glycidyl methacrylate, maleic anhydride or itaconic anhydride. Further modifying monomers which may be incorporated into the shell by polymerization are for example styrene, acrylonitrile, acrylamide or hydroxyethyl methacrylate.

In addition to the core and the shell the core-shell modifier may also comprise one or more intermediate shells if this is advantageous for achieving certain properties.

The production of such core-shell modifiers is described in EP0722961A1 or US2009/0149600 for example. Suitable types are commercially available.

In a further preferred embodiment the core b1) does not comprise any styrene units.

The styrene-ethylene/butylene-styrene block copolymer concerns a linear triblock copolymer (SEBS) made of an ethylene/butylene block and two styrene blocks.

A preferred embodiment provides that the proportion of styrene in the functionalised styrene-ethylene/butylene-styrene block copolymer is preferably 20 to 45% by weight, particularly preferred 25 to 40% by weight and very particularly preferred 25 to 35% by weight.

The functionalised styrene-ethylene/butylene-styrene block copolymer preferably has a melt-volume flow rate of 90 to 160 ccm/10 min, particularly preferred of 100 to 150 ccm/10 min and very particularly preferred of 110 to 140 ccm/10 min. The melt-volume flow rate was measured at 275° C. and 5 kg according to ISO 1133.

There should be understood by functionalised styrene-ethylene/butylene-styrene block copolymer, a styrene-ethylene/butylene-styrene block copolymer functionalised by acid modification. This acid modification is effected by grafting with unsaturated carboxylic acids and/or unsaturated carboxylic acid derivatives, preferably a carboxylic acid derivative selected from the group consisting of unsaturated carboxylic acid esters and unsaturated carboxylic acid anhydrides, in particular with an unsaturated carboxylic acid and/or the anhydride thereof selected from the group consisting of acrylic acid, methacrylic acid, alpha-ethyl acrylic acid, maleic acid, fumaric acid, itaconic acid, citraconic acid, aconitic acid, tetrahydrophthalic acid and/or butenylsuccinic acid, i.e. that the styrene-ethylene-butylene/styrene block copolymer comprises grafted unsaturated carboxylic acids and/or unsaturated carboxylic acid derivatives in the molecule. The conditions under which the grafting of the styrene-ethylene/butylene-styrene block copolymer takes place is common knowledge to the person skilled in the art.

The proportion of unsaturated carboxylic acids and/or unsaturated carboxylic acid derivatives in the functionalised styrene-ethylene/butylene-styrene block copolymer is preferably 1.0 to 2.3% by weight, particularly preferred 1.1 to 2.0% by weight, very particular preferred 1.4 to 1.9% by weight.

In a further embodiment, the impact modifier is composed of a functionalised styrene-ethylene-butylene/styrene block copolymer proportion and a non-functionalised styrene-ethylene/butylene-styrene block copolymer proportion. The functionalisation proportion of the functionalised block copolymer and the respective proportions of the functionalised and of the non-functionalised block copolymer are chosen then such that, for the impact modifier, in total a functionalisation proportion of preferably 1.0 to 2.3% by weight, particularly preferred 1.1 to 2.0% by weight, very particularly preferred 1.4 to 1.9% by weight, results.

For particular preference, the acid modification of the styrene-ethylene/butylene-styrene block copolymer is effected with maleic acid anhydride, the proportion of maleic acid anhydride of the functionalised styrene-ethylene/butylene-styrene block copolymer being preferably 1.0 to 2.3% by weight, particularly preferred 1.1 to 2.0% by weight, very particularly preferred 1.4 to 1.9% by weight.

In order to impair the transparency of the moulding material to the smallest possible extent the core-shell modifier is preferably chosen such that:
the difference in the refractive indices between the polyamide component and the core-shell modifier at 20° C. is less than 0.008, particularly preferably less than 0.005 and especially preferably less than 0.003,
and/or
the difference in the refractive indices between the polyamide component according to a) and functionalised styrene-ethylene/butylene-styrene block copolymer c) at 20° C. is less than 0.008, particularly preferably less than 0.005 and especially preferably less than 0.003.

These refractive indices are determined to DIN EN ISO 489:1999 by method A (Zeiss Abbe model A instrument, Schott KL 150 B lamp, white cold light source). However, for a particle size in the lower range, for instance below 200 nm and in particular below 160 nm, a high transparency is retained even at a relatively high difference in the refractive indices.

The moulding material according to the invention is preferably transparent having a haze of less than 15%, preferably less than 10% measured on injection moulded test specimens having a thickness of 2 mm according to ASTM D1003.

The moulding material according to the invention may comprise as constituents, in addition to the components according to a), b) and c), further customary added substances preferably chosen such that they impair transparency only to the smallest possible extent if at all, for example flame retardants, stabilizers, plasticizers, glass fibres, fillers, nanoparticles, antistats, dyes, pigments, mould-release agents or flow assistants. The amount of these further constituents is altogether not more than 50 wt %, preferably not more than 40 wt %, particularly preferably not more than 30 wt %, especially preferably not more than 20 wt % and very particularly preferably not more than 10 wt % or not more than 5 wt % based on the overall moulding material.

The moulding material may be produced by melt mixing on suitable kneaders or compounding machines, discharging and comminution. A multiphase system is concerned here where the modifier is present in the polyamide matrix in finely disperse form. The melt mixing is effected according to the prior art in a kneading assembly, discharge generally in the form of a strand/extrudate and comminution generally by pelletizing, crushing or grinding. The moulding material may be processed into a moulded article by melting and moulding by processes known to those skilled in the art such as injection moulding, extrusion, pressing or rolling.

The invention also provides the moulded articles produced from the mixture according to the claims. These are for example mouldings, films, bristles or fibres.

The moulded articles according to the invention feature in particular a combination of high transparency, high toughness and high resistance to chemicals, solvents and stress cracking. Possible applications are for example eyeglasses frames or other frames and also components where high mechanical resilience is required. Lifetime can be increased here by use of the mixture according to the invention The invention moreover makes it possible to produce films of higher perceived quality, for example for outer coatings of sports items such as skis or snowboards. This is apparent for example in a reduced speck count.

The invention is elucidated by way of example hereinbelow.

The following materials were employed in the examples:

PA PACM12: microcrystalline polyamide produced from bis(4-aminocyclohexyl)methane having a content of trans, trans-stereoisomer of 48% and also dodecanedioic acid; $\eta_{rel}$=1.8; enthalpy of fusion 19 J/g, which can be prepared according to the disclosure of U.S. Pat. No. 5,360,891

Core-shell modifier: Paraloid EXL 2690 (Dow Chemical Company; shown by analysis to consist to an extent of about 80 wt % of a core in which only units of butadiene and no styrene units are detectable and to an extent of about 20 wt % of a shell constructed essentially from methyl methacrylate units)

SEBS modifier: Kraton FG1901 (Kraton Polymers LLC, USA; a styrene-ethylene/butylene-styrene block copolymer with 30% by wt. styrene, grafted with 1.7% by wt. maleic acid anhydride, MVR 130 ccm/10 min at 275° C. and 5 kg)

Melt mixtures were produced on a Coperion ZSK-26mc co-rotating twin screw extruder, discharged, pelletized to obtain the polymer composites according to the recipe indicated in Table 1, wherein the polyamides were fed into the main port of extruder and then mixed at 280° C., and the impact modifiers were fed via a side feeder into the extruder.

The polymer composites in pellet form were processed on an injection moulding machine Engel VC 650/200 (melt temperature 280° C.; mould temperature 60° C.) to prepare specimens for mechanical performance tests and haze value test.

Tensile modulus of elasticity, tensile stress at yield and tensile strain at break were determined by Zwick Z020 materials testing system according to ISO 527, on ISO tensile specimens, type 1A, 170 mm×10 mm×4 mm at a temperature (23±2°) C., relative humidity (50±10)%.

Notched impact strength was determined by CEAST Resil Impactor 6967.000, according to ISO 179/1eA (Charpy) on tensile specimens ISO 527 type 1A which were cut off two ends, 80 mm×10 mm×4 mm at a temperature (23±2) ° C., relative humidity (50±10)%.

Haze value was determined at 23° C., by Spectrophotometer CM-3600d from KONICA MINOLTA according to ASTM D1003 (CIE C illuminant) on 2 mm thickness plate of size 55 mm×30 mm, and haze value was stated in percentage.

The overall results are shown in Table 1.

TABLE 1

Recipe and performance

| | Reference | E1 | E2 | E3 | CE1 | CE2 |
|---|---|---|---|---|---|---|
| Recipe | | | | | | |
| PA PACM 12 | 100% | 85% | 80% | 90% | 85% | 90% |
| Kraton FG1901 | | 3% | 1% | 5% | 15% | 10% |
| Paraloid EXL 2690 | | 12% | 19% | 5% | | |
| Performance | | | | | | |
| Tensile modulus (MPa) | 1400 | 1130 | 1050 | 1120 | 1160 | 1300 |
| Stress at yield (MPa) | 57.2 | 44.3 | 39.9 | 48.4 | 44.8 | 49.1 |
| Strain at break (%) | 246.4 | 184.0 | 136.5 | 179.8 | 191.9 | 149.1 |
| Notched impact strength (kJ/m$^2$) | 12 | 56 | 32 | 75 | 60 | 60 |
| Haze value (%) | 1.0 | 9.0 | 3 | 12 | 25.3 | 16.3 |

Refractive index (20° C.) PA PACM12: 1.516
Refractive index (20° C.) Paraloid EXL 2690: 1.514
Refractive index (20° C.) Kraton FG1901: 1.507

Compared to the PA PACM12 (Reference 1), E1-E3 of the present invention show a slightly reduced transparency and a very good notched impact strength.

Compared to CE1-2, E1 and E3 of the present invention show an improved transparency and barely reduced notched impact strength.

The invention claimed is:

1. A moulding material, comprising:
at least 50 wt % of a combination of following constituents:
a) 80 to 95 parts by mass of a polyamide component, comprising:
a1) 70 to 100 parts by wt of a polyamide composed of monomer units from bis(4-aminocyclohexyl)methane and a linear dicarboxylic acid having X carbon atoms (PA PACMX), wherein (X=8 to 18, and
a2) 0 to 30 parts by wt of a linear aliphatic polyamide, having on average 8 to 12 carbon atoms in a monomer unit,
wherein a1) and a2) sum to parts by wt,
b) 4 to 19 parts by mass of a core-shell impact modifier, which comprises the following:
b1) a core which comprises 60 to 100 wt % of a butadiene unit and 0 to 40 wt % of a styrene unit, wherein the core makes up 60 to 95 wt % of the core-shell impact modifier; and
b2) a shell which comprises 80 to 100 wt % of a methyl methacrylate unit and 0 to 20 wt % of a modifying monomer unit, wherein the shell makes up 5 to 40 wt % of the core-shell impact modifier, and
c) 1 to 5 parts by mass of a functionalized styrene-ethylene/butylene-styrene block copolymer as an impact modifier,
wherein the parts by mass of a), b), and c) sum to 100.

2. The moulding material according to claim 1, wherein the PA PACMX is selected from the group consisting of PA PACM10, PA PACM12, PA PACM14, and mixtures thereof.

3. The moulding material according to claim 2, wherein PA PACMX is PA PACM12, and wherein the PA PACM12 has been produced from a PACM having a content of a trans, trans isomer of 30% to 70% and is microcrystalline with an enthalpy of fusion, measured in accordance with ISO 11357 at the second heating at a heating and cooling rate of 20° C./min, of 5 to 40 J/g.

4. The moulding material according to claim 3, wherein the PA PACM12 has been produced from the PACM having the content of the trans, trans isomer of 35% to 65% and is microcrystalline with the enthalpy of fusion, measured in accordance with ISO 11357 at the 2nd heating at the heating and cooling rate of 20° C./min. of 8 to 35 J/g.

5. The moulding material according to claim 1, wherein the PA PACMX has been produced from PACM having a content of a trans, trans isomer of 30% to 70%.

6. The moulding material according to claim 5, wherein the PA PACMX has been produced from PACM having the content of the trans, trans isomer of 35% to 65%.

7. The moulding material according to claim 1, wherein the PA PACMX is microcrystalline with an enthalpy of fusion, measured in accordance with ISO 11357 at the 2nd heating at a heating and cooling rate of 20° C./min, of 5 to 40 J/g.

8. The moulding material according to claim 7, wherein the PA PACMX is microcrystalline with the enthalpy of fusion, measured in accordance with ISO 11357 at the 2nd heating at the heating and cooling rate of 20° C./min, of 8 to 35 J/g.

9. The moulding material according to claim 1, wherein the PA PACMX is transparent with a haze of less than 3%, which is determined according to ASTM D 1003 on an injection moulded test specimen of 2 mm in thickness.

10. The moulding material according to claim 9, wherein the PA PACMX is transparent with the haze of less than 2%, determined according to ASTM D 1003 on the injection moulded test specimen of 2 mm in thickness.

11. The moulding material according to claim 1, wherein the core b1) does not comprise any styrene unit,
and/or
wherein the functionalized styrene-ethylene/butylene-styrene block copolymer c) has a proportion of styrene of 20 to 45% by weight.

12. The moulding material according to claim 11, wherein the functionalized styrene-ethylene/butylene-styrene block copolymer c) has the proportion of styrene of 25 to 35% by weight.

13. The moulding material according to claim 1, wherein a difference in refractive indices between the polyamide component according to a) and the core-shell modifier according to b) at 20° C. is less than 0.008, measured according to DIN EN ISO 489:1999 by method A,
and/or
a difference in refractive indices between the polyamide component according to a) and the functionalized styrene-ethylene/butylene-styrene block copolymer c) at 20° C. is less than 0.008, measured according to DIN EN ISO 489:1999 by method A.

14. The moulding material according to claim 13, wherein the difference in the refractive indices between the polyamide component according to a) and the core-shell modifier according to b) at 20° C. is less than 0.003, measured according to DIN EN ISO 489:1999 by method A,
and/or
the difference in the refractive indices between the polyamide component according to a) and the functionalized styrene-ethylene/butylene-styrene block copolymer c) at 20° C. is less than 0.003, measured according to DIN EN ISO 489:1999 by method A.

15. The moulding material according to claim 1, wherein the moulding material is transparent with a haze of less than 15%, which is measured according to ASTM D1003 on an injection moulded test specimen of 2 mm in thickness.

16. The moulding material according to claim 1, wherein the moulding material consists of the components a), b), and c) and not more than 50 wt % of further customary added substances.

17. A moulded article produced from the moulding material according to claim 1.

18. The moulded article according to claim 17, which is a moulding, a film, a bristle, or a fibre.

19. The moulded article according to claim 17, which article is an eyeglasses frame, another frame, or a surface coating of a sports article.

20. The moulding material according to claim 1, wherein the polyamide component a) has 85 to 95 parts by mass and the core-shell impact modifier b) has 5 to 15 parts by mass.

* * * * *